United States Patent
Kinomura

(10) Patent No.: US 8,554,780 B2
(45) Date of Patent: Oct. 8, 2013

(54) SEARCH APPARATUS AND SEARCH METHOD

(75) Inventor: Mitsuhiro Kinomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/036,156

(22) Filed: Feb. 28, 2011

(65) Prior Publication Data

US 2011/0246507 A1    Oct. 6, 2011

(30) Foreign Application Priority Data

Mar. 31, 2010    (JP) .................................. 2010-083784

(51) Int. Cl.
*G06F 17/00*    (2006.01)

(52) U.S. Cl.
USPC ........... 707/758; 707/899; 707/813; 707/736; 707/713; 707/769

(58) Field of Classification Search
USPC .......... 707/769, 713, 736, 758, 781, 813, 899
See application file for complete search history.

(56) References Cited

U.S. PATENT DOCUMENTS 7,721,214 B2 *    5/2010    Dowling ........................ 715/738

FOREIGN PATENT DOCUMENTS

| JP | 2000-348038 A | 12/2000 |
|----|---------------|---------|
| JP | 2002-073589 A | 3/2002  |

* cited by examiner

*Primary Examiner* — Sana Al Hashemi
(74) *Attorney, Agent, or Firm* — Fujitsu Patent Center

(57) ABSTRACT

When an output request is received, a tree generating unit of a search apparatus generates, based on an output item included in an output request tree-structure data from hierarchical-structure data (described as search target data with reference to FIG. 1) to be searched. A tree scanning unit searches for data corresponding to the output item by scanning the tree-structure data generated by the tree generating unit. An output unit outputs the data searched by the tree scanning unit.

5 Claims, 13 Drawing Sheets

```
/DOCUMENT/SLIP/SPECIFICATION {
../../DOCUMENT HEADER     := DOCUMENT HEADER
./SPECIFICATION HEADER    := SPECIFICATION HEADER    } OUTPUT ITEMS
./VALUE[last-1]           := VALUE [SECOND FROM LAST]
}
```

FIG.5

```
<DOCUMENT>
<DOCUMENT HEADER> COMPANY A TRANSACTION LEDGER </DOCUMENT HEADER>
<STAFF> YAMADA TARO </STAFF>
<TEL> 111-222-3333 </TEL>
<SLIP>
<SLIP HEADER> ORDER SLIP 1 </SLIP HEADER>
<TRANSACTION DATE AND TIME>2009/10/29 </TRANSACTION DATE AND TIME>
<SPECIFICATION id="1">
<SPECIFICATION HEADER> TV </SPECIFICATION HEADER>
<NUMBER OF ORDERS> 100 </NUMBER OF ORDERS>
<VALUE> 10 </VALUE> <VALUE> 20</VALUE> <VALUE>30</VALUE> <VALUE>0</VALUE> <VALUE>40</VALUE>
</SPECIFICATION>
<SPECIFICATION id="2">
<SPECIFICATION HEADER> CAMERA </SPECIFICATION HEADER>
<NUMBER OF ORDERS> 50 </NUMBER OF ORDERS>
<VALUE> 20 </VALUE> <VALUE> 0 </VALUE> <VALUE> 30 </VALUE> <VALUE> 0 </VALUE>
</SPECIFICATION>
</SLIP>
<SLIP>
<SLIP HEADER> ORDER SLIP 2 </SLIP HEADER>
<SPECIFICATION id="3">
<SPECIFICATION HEADER> AIR-CONDITIONER </SPECIFICATION HEADER>
<NUMBER OF ORDERS> 200 </NUMBER OF ORDERS>
<VALUE> 0 </VALUE> <VALUE> 100 </VALUE> <VALUE> 50 </VALUE> <VALUE> 30 </VALUE> <VALUE> 20 </VALUE>
</SPECIFICATION>
</SLIP>
</DOCUMENT>
```

FIG.8

| DOCUMENT HEADER | SPECIFICATION HEADER | VALUE (SECOND FROM LAST) |
|---|---|---|
| COMPANY A TRANSACTION LEDGER | TV | 0 |
| COMPANY A TRANSACTION LEDGER | CAMERA | 30 |
| COMPANY A TRANSACTION LEDGER | AIR-CONDITIONER | 30 |

SEARCH APPARATUS AND SEARCH METHOD

CROSS-REFERENCE TO RELATED APPLICATION

This application is based upon and claims the benefit of priority of the prior Japanese Patent Application No. 2010-083784, filed on Mar. 31, 2010, the entire contents of which are incorporated herein by reference.

FIELD

The embodiments discussed herein are directed to a search apparatus and a search method.

BACKGROUND

Recently, in response to a search request from a user, a search result is provided through a process in which hierarchical-structure data (for example, XML-format data) is converted into table-format data (for example, CSV-format data).

Here, described in detail is about a search process of an information processing apparatus that has XML-format data as search target data. When a search request is received in which XML-format data is set as search target data, the information processing apparatus, as illustrated in FIG. 13 as an example, generates tree-structure data from the entirety of the XML-format data. FIG. 13 is a diagram illustrating the tree structure of the search target data.

The information processing apparatus searches for output items by scanning the tree-structure data. For example, when described using an example illustrated in FIG. 14, the information processing apparatus searches for data corresponding to the output items by scanning the entire tree-structure data in a case where the output items, which are output as a search result, are "document header," "specification header," and "the second last value" (see (1) to (20) illustrated in FIG. 14). Then, the information processing apparatus outputs the retrieved data in CSV-format.

In addition, a technology is known in which potential search target data in searching is extracted from the tree-structure data and the extracted potential search target data in tree-structure is stored in a lump.

An example of the related art is Japanese Laid-open Patent Publication No. 2000-348038.

However, according to the above-described technology in which a search is performed by generating the above-described tree, the size of the tree-structure data is large. Accordingly, there are problems in that the amount of memory consumption increases and the time required for the search process is long.

In other words, according to the technology in which a search is performed by generating the above-described tree, the tree-structure data is generated from the entirety of XML-format data. Accordingly, the size of the tree-structure data increases and the amount of memory consumption increases. In addition, since the search is performed by scanning the tree-structure data having a large size, the time required for a search process is long.

In addition, a technology of storing information on part of the tree-structure data in a lump similarly involves problems in that the size of the data is large and thus the memory consumption is large and the processing time is long in the case in which the potential search target data is large in volume.

SUMMARY

According to an aspect of an embodiment of the invention, a search apparatus includes a generating unit that generates, based on an output item included in an output request when the output request is received, tree-structure data from hierarchical-structure data to be searched, a searching unit that searches for data corresponding to the output item by scanning the tree-structure data generated by the generating unit, and an outputting unit that outputs the data searched for by the searching unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating an example of an XML text;

FIG. 8 is a diagram illustrating a processing result;

DESCRIPTION OF EMBODIMENTS

Preferred embodiments of the present invention will be explained with reference to accompanying drawings. However, the present invention is not limited thereto.

[a] First Embodiment

Figure 1:
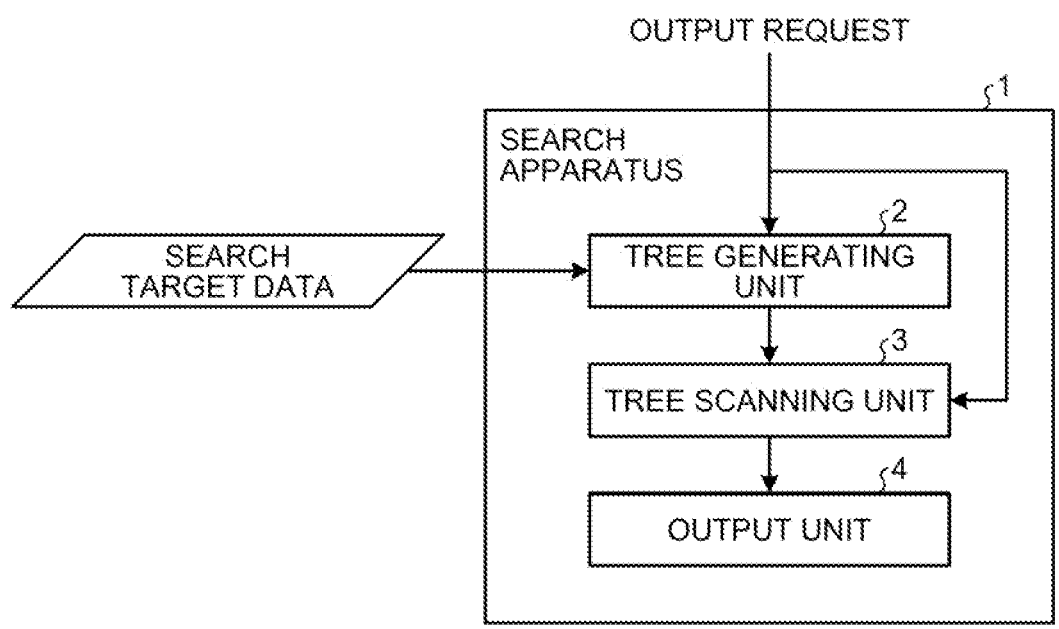
FIG. 1 is a block diagram illustrating a search apparatus according to a first embodiment.

First, the configuration of a search apparatus according to a first embodiment will be described with reference to FIG. 1. FIG. 1 is a block diagram illustrating the configuration of the search apparatus according to the first embodiment.

A search apparatus 1 according to the first embodiment includes a tree generating unit 2, a tree scanning unit 3, and an output unit 4. When an output request is received, the tree generating unit 2 generates tree structure data from hierarchical structure data (in FIG. 1, denoted as search target data) to be searched based on an output item included in the output request.

The tree scanning unit 3 searches for data corresponding to the output item by scanning the tree structure data that is generated by the tree generating unit 2. The output unit 4 outputs the data searched by the tree scanning unit 3.

In other words, the search apparatus 1 generates the tree structure data that is minimally required for the output item requested by a user, instead of generating the tree structure data from the whole search target data, whereby the amount of consumption of the memory can be reduced. In addition, the search apparatus 1 scans a tree that is generated to have the requisite minimum size, and accordingly, the time required for a search process can be shortened.

Accordingly, when the output request is received, the search apparatus 1 generates the tree structure data from the hierarchical structure data based on the output item that is included in the output request. Then, the search apparatus 1 searches for data corresponding to the output item by scanning the generated tree structure data and outputs the data. Accordingly, the search apparatus 1 generates a data tree having the requisite minimum size and scans the tree generated so as to have requisite minimum size. Therefore, the amount of consumption of the memory can be reduced, and the time required for a search process can be shortened.

[b] Second Embodiment

In the following embodiment, the configuration and the flow of the process of an information processing apparatus according to a second embodiment will be sequentially described, and, at the end, the advantages of the second embodiment will be described.

Configuration of Monitoring Apparatus

Figure 2:
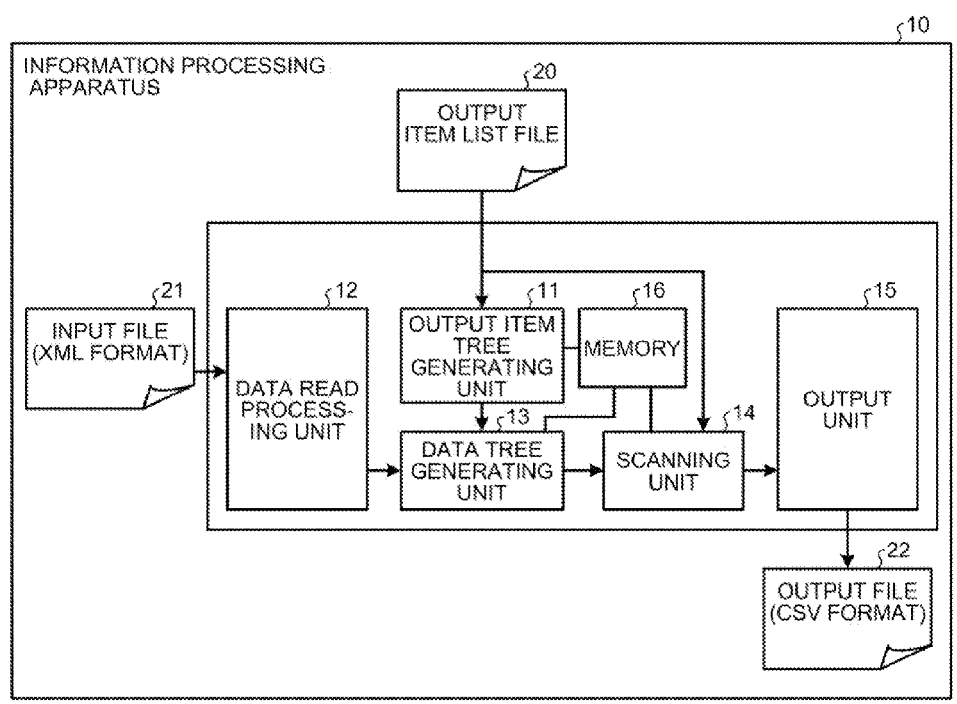
FIG. 2 is a block diagram illustrating an information processing apparatus according to a second embodiment.

Next, the configuration of an information processing apparatus 10 will be described with reference to FIG. 2. FIG. 2 is a block diagram illustrating an information processing apparatus according to the second embodiment. As illustrated in FIG. 2, the information processing apparatus 10 includes an output item tree generating unit 11, a data read processing unit 12, a data tree generating unit 13, a scanning unit 14, an output unit 15, and a memory 16. Hereinafter, the processes of these units will be described.

Figures 3, 4:
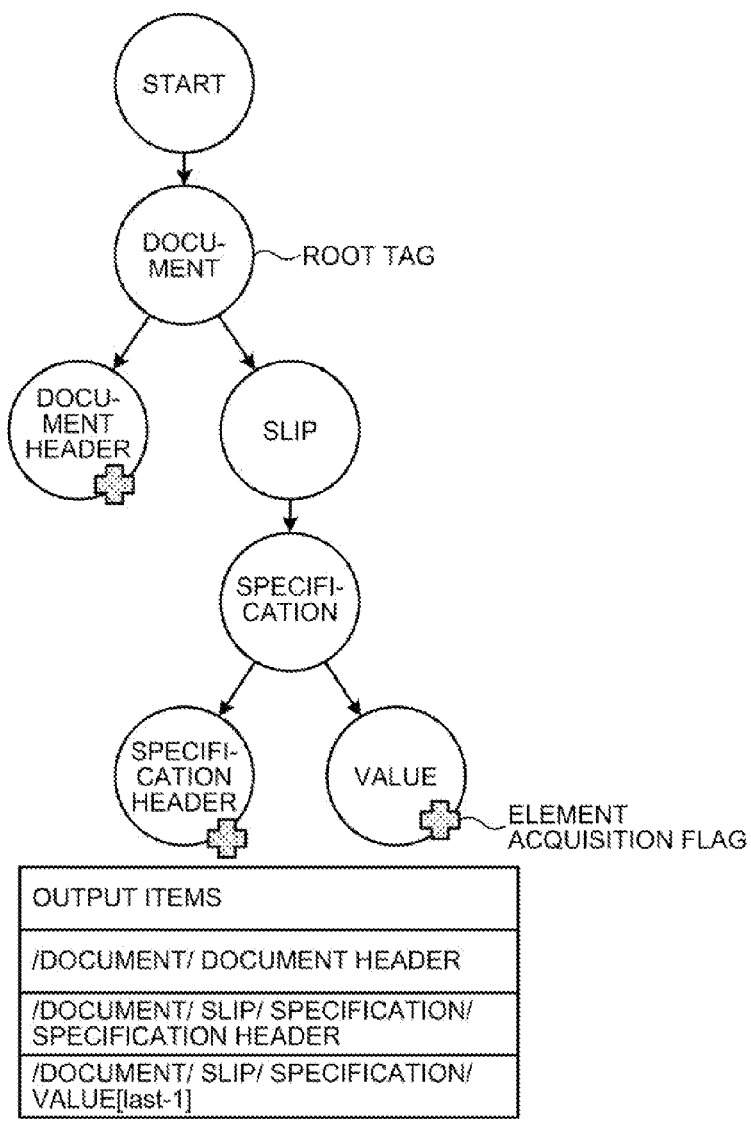
FIG. 3 is a diagram illustrating output items.
FIG. 4 is a diagram illustrating an output item tree generating process.

The output item tree generating unit 11 receives an output item list file 20 as an output request from a user and generates an output item tree that represents items needed for generating a data tree by using the output item list file 20. Here, the output item tree is tree structure data representing the connection relationship between tags of output items. More specifically, the output item tree generating unit 11 receives the output item list file 20, as illustrated in FIG. 3 as an example. FIG. 3 is a diagram illustrating the output items.

In the example illustrated in FIG. 3, "/document/slip/specification" that represents a determination tag of output items is described in the output item list file 20. In addition, in the output item list file 20, as output items, "../../document tag:=document tag header," "./specification header:=specification header," "./value[last−1]:=value [second from last]" are described. Here, "../" represents a retrograde axis. In other words, "../../document tag:=document tag header" represents that, after tracing a document, a slip, and a specification, a retracement is temporarily made to the document, and the element content of the document header that is present under the document is output as an output item.

In addition, "./specification header:=specification header" represents outputting the element content of a specification header that is present under the specification as an output item. Furthermore, "./value[last−1]:=value [second from last]" represents outputting the value positioned at the second last among values that are present under the specification as an output item. In FIG. 3, underlined tags "document header," "specification header," and "value[last−1]" represent final tags having the element contents to be output.

When the output item list file 20 is received, the output item tree generating unit 11 analyzes the items to be output and generates a chain that represents registration of tags described in the output item list file 20 and the connection relationship between the tags, thereby generating an output item tree.

Here, a process of generating an output item tree will be described with reference to FIG. 4. As illustrated in FIG. 4, the output item tree generating unit 11 analyzes the output item list file 20 and generates an output item table that represents items to be output. The table illustrated in FIG. 4 as an example is a table that is generated based on the output item list file 20 illustrated in FIG. 3 as an example, and a determination tag "/document/slip/specification" and an output item "../../document tag:=document tag header" correspond to an output item "/document/document header".

In addition, a determination tag "/document/slip/specification" and an output item "./specification header:=specification header" correspond to an output item "/document/slip/specification/specification header." In addition, a determination tag "/document/slip/specification" and an output item "./value[last−1]" correspond to an output item "/document/slip/specification/specification header." For example, "/document/document header" represents outputting the element content of the document header from the tag of the document header that is present under the document tag.

Then, a process is repeated in which the output item tree generating unit 11 fetches one higher-level tag from the output item table and performs registration and chain generation of the tag, moves the process to a lower-level tag, fetches one lower-level tag from the output item table, and performs registration in the output item tree and chain generation of the tag. Here, the output item tree generating unit 11 does not register a tag that has been already registered so as to avoid duplicate registration.

When described more specifically by using the example illustrated in FIG. 4, the output item tree generating unit 11 fetches one tag "document" from the output item "/document/document header" of the output item table and registers the tag in the output item tree. Hereinafter, a leading tag is referred to as a root tag. Then, the output item tree generating unit 11 moves the process to a lower-level tag, fetches a tag "document header," registers the tag in the output item tree, and generates a chain that represents a connection with the document tag.

In a case where a next lower-level tag is not present, the output item tree generating unit 11, as illustrated in FIG. 4, sets an element acquisition flag of the tag "document header" to "ON." Here, as will be described later, the element content of a tag of which the element acquisition flag is "ON" is acquired and a data tree is generated.

Then, the output item tree generating unit 11, as illustrated in FIG. 4, moves the process to the next output item and fetches one tag of "document" from the output item "/document/slip/specification/specification header." Here, since the output item tree has been generated for the tag of "document," the output item tree generating unit 11 does not generate a data tree for the tag "document" and moves the process to the next tag "slip." As above, the output item tree generating unit 11 repeats the above-described process, and whereby generating an output item tree as illustrated in FIG. 4 as an example. Thereafter, the output item tree generating unit 11 stores the output item tree in the memory 16.

When an output request is received, the data read processing unit 12 reads out XML-format data of an input file 21 having a hierarchical structure in which repeated items are present as output target data. For example, the data read processing unit 12, as illustrated in FIG. 5 as an example, reads out XML-format data of the input file 21 and notifies the data tree generating unit 13 of the read out data.

The data tree generating unit 13 generates tree-structure data from XML-format data by using the output item tree that is generated in accordance with the output item included in the output item list file 20. More specifically, the data tree generating unit 13 receives the XML-format data from the data read processing unit 12, fetches a root tag name that is a leading tag name from the XML-format data, and compares the fetched root tag name with a root tag name of the output item tree that is stored in the memory 16.

For example, in the examples illustrated in FIGS. 4 and 5, the root tag name of the XML-format data is "document," and the root tag name of the output item tree is also "document," and accordingly, both the root tag names are determined to coincide with each other by the data tree generating unit 13. As a result, in a case where the root tag name of the XML-format data does not coincide with the root tag name of the output item tree, the information processing apparatus 10 terminates the data tree generating process.

On the other hand, in a case where the root tag name of the XML-format data coincides with the root tag name of the output item tree, the data tree generating unit 13 sets the current position of the output item tree to the root tag name and registers the root tag in the data tree. Then, the data tree generating unit 13 moves the process to the next lower-level tag of the root tag of the XML-format data and determines whether or not there is a tag that is same as the tag of the movement destination in the output item tree.

As a result, in a case where there is no the same tag as that of the output item tree, the data tree generating unit 13 skips in reading to a completion tag and moves the process to the next lower-level tag. On the other hand, in a case where there is the same tag as that of the output item tree, the data tree generating unit 13 moves the current position of the output item tree and registers the tag in the data tree, and generates a bidirectional chain to the previous tree.

Then, the data tree generating unit 13 sets a fast path 17 of the previous tree. In addition, when the element acquisition flag is "ON," the data tree generating unit 13 acquires an element. Here, the fast path 17 is information representing a memory address of the leading content element and a memory address of the rear-most content element out of a plurality of elements arranged under the tag of the output item of the data tree and is stored in the memory 16.

Figure 6:
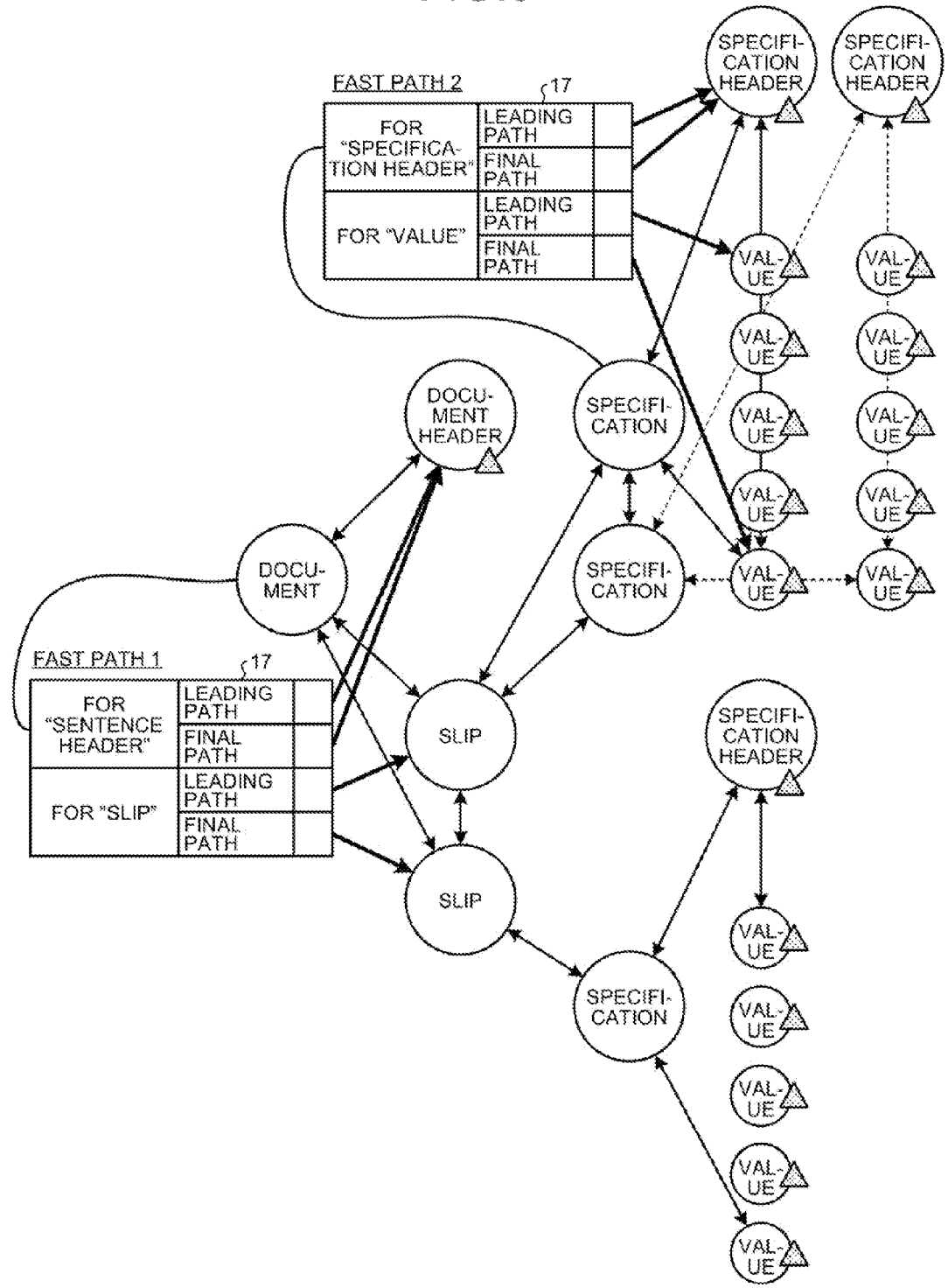
FIG. 6 is a diagram illustrating a data tree generating process.

Here, a process of generating a data tree illustrated in FIG. 6 as an example based on the output item tree illustrated in FIG. 4 as an example and the XML-format data illustrated in FIG. 5 as an example will be described in more detail. As illustrated in FIG. 6, since the root tag name "document" (see the example illustrated in FIG. 5) of the XML-format data and the root tag name "document" (see the example illustrated in FIG. 4) of the output item tree coincide with each other, the data tree generating unit 13 registers the root tag "document."

Then, the data tree generating unit 13, as illustrated in FIG. 5, moves the process to the next lower-level tag "document header" of the root tag name "document" and determines whether or not there is the same tag as that of the output item tree illustrated in FIG. 4. As a result, since "document header" is present in the output item tree, the data tree generating unit 13 registers the tag "document header" in the data tree and generates a bidirectional chain for the root tag "document."

Then, the data tree generating unit 13, as illustrated in FIG. 6, generates the fast path 17 of the previous tree. Here, the data tree generating unit 13, as the fast path 17, as illustrated in FIG. 6, generates the fast path 17 in which that a "leading path" representing the address of the leading element of the lower-level tag and a "final path" representing the memory address of the final element of the lower-level tag are associated with each other. In a case where there is only one element, the leading path and the final path come to have the same address.

Since the element acquisition flag is of the "document header" is "ON," as illustrated in FIG. 4, the data tree generating unit 13 acquires an element "company A transaction ledger" and registers the element in the data tree. Thereafter, the data tree generating unit 13 generates a data tree by repeating the above-described data tree generating process for all the tags and stores the data tree in the memory 16.

As above, the data tree generating unit 13 generates a data tree based on the output item tree, and accordingly, a requisite minimum data tree is generated based on the output item requested by the user, whereby the amount of consumption of the memory 16 can be reduced.

The scanning unit 14 searches for data corresponding to the output item list file 20 by scanning the tree-structure data that is generated by the data tree generating unit 13. More specifically, the scanning unit 14 reads out the data tree from the memory 16 and moves up to the determination tag of an output item record. For example, in a case where the determination tag of the output item record is "/document/slip/specification," the scanning unit 14 goes down to the specification by tracing the document and the slip. Here, the term "tracing" means searching along tags connected by chains on a data tree.

Then, the scanning unit 14 fetches one tag of one output item and determines whether or not there is description of "last" in the tag. When "last" is described in the tag, the scanning unit 14 moves in the data tree to the tag by using the final path of the fast path information. On the other hand, when "last" is not described in the tag, the scanning unit 14 moves in the data tree by using the leading path of the fast path information.

Then, the scanning unit 14 determines whether or not the tag of the movement destination is the final tag. When the tag of the movement destination is not the final tag, the scanning unit 14 moves to the next lower-level tag, fetches one tag of one output item, and repeats the above-described process. On the other hand, when the tag of the movement destination is the final tag, the scanning unit 14 puts the element content arranged under the final tag into a write buffer maintained by the scanning unit 14.

Here, the scanning of the data tree will be described in more detail with reference to FIG. 7. For example, in a case where the determination tag of the output item record is "document/slip/specification," the scanning unit 14 traces "document" and "slip" and reaches the tag of "specification" (see (1) and (2) illustrated in FIG. 7).

Figure 7:
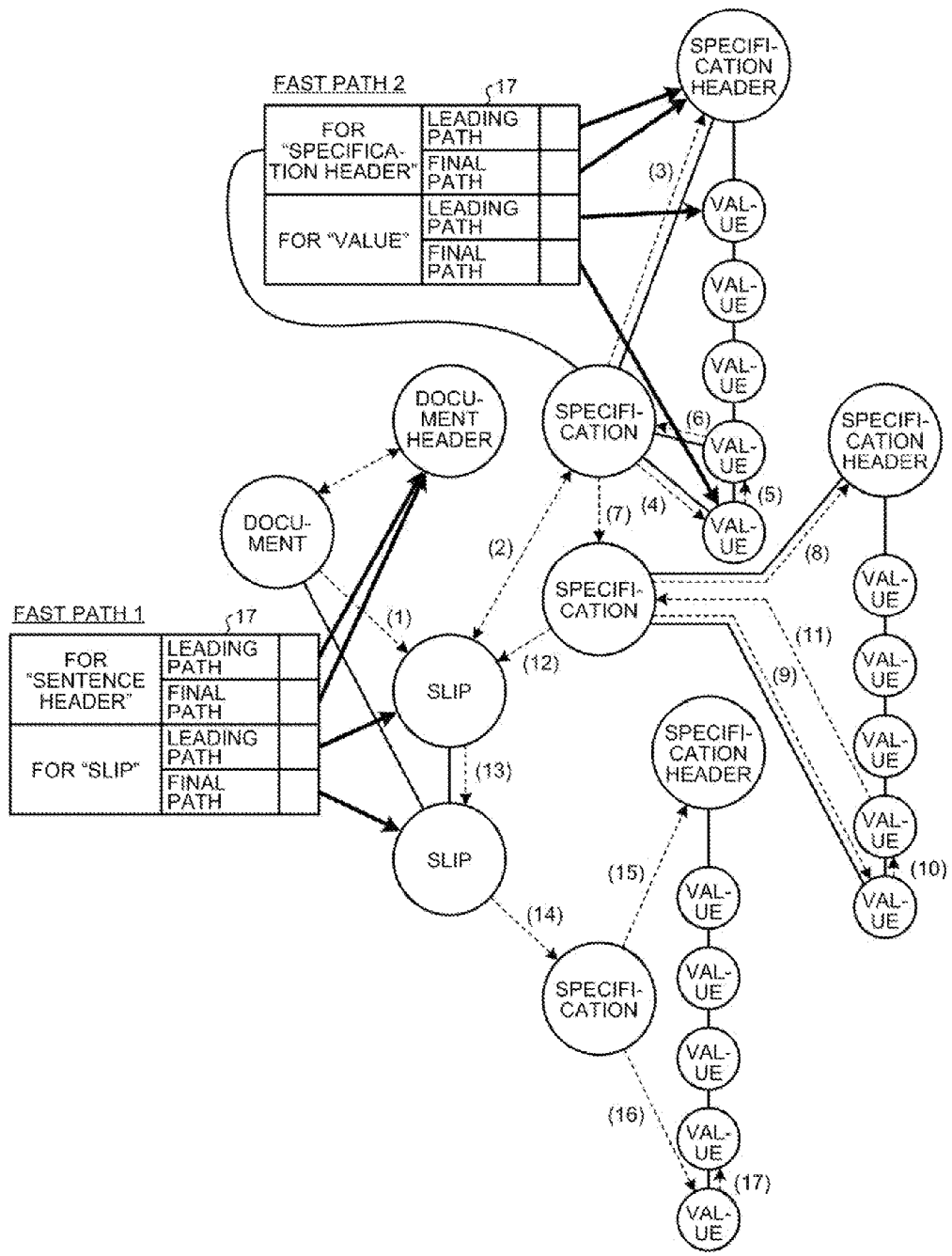
FIG. 7 is a diagram illustrating a data tree scanning process.

Then, in a case where the scanning unit 14 fetches "specification header" as one tag of one output item, there is no description of "last" in "./specification header:=specification header" of the output item, and accordingly, the scanning unit 14 moves in the data tree using the leading path to the "specification header" (see (3) illustrated in FIG. 7). Here, since "specification header" is the final tag, the scanning unit 14 puts "TV" that is an element content of the "specification header" into the write buffer."

Next, in a case where the scanning unit 14 fetches "value [last−1]" as the tag of the next output item, there is a text of "last" in "./value[last−1]:value[second from the last]" of the output item. In this case, the scanning unit 14 reads out the memory address of the final path from the fast path 17, traces the memory address from the final path, and goes to "the second last value" (see (4) and (5) illustrated in FIG. 7).

Here, since "value[last−1]" is the final tag, the scanning unit 14 puts the value "0" of the element content of "second last value" into the write buffer and goes back to the "specification" tag (see (6) illustrated in FIG. 7). Thereafter, the scanning unit 14 performs a similar scanning process, moves to the tag of "specification header" and "second value from the last" (see (7) to (17) illustrated in FIG. 7), and puts the element content into the write buffer.

As above, by scanning using the fast path 17, the scanning unit 14 can output a search result at high speed even for a user's request of a broad range such as "second from the leading" or "fifth from the last." Here, the method of searching for an output item from the data tree by using the scanning unit 14 is not limited to the above-described scanning process, and different search methods may be used.

The output unit 15 outputs an output item that is retrieved. More specifically, the output unit 14 writes the element content that is set by the scanning unit 14 and, as illustrated in FIG. 8 as an example, outputs the CSV-format data of an output file 22 as an output result. For example, as illustrated in FIG. 8 as an example, the output unit 15 outputs the output item "document header" being associated with the element "company A transaction ledger", the output item "specification header" being associated with the element "TV", and the output item "value[second from the last]" being associated with the element "0".

In addition, as illustrated in FIG. 8 as an example, the output unit 15 outputs the output item "document header" being associated with the element "company A transaction ledger," the output item "specification header" being associated with the element "camera," and the output item "value [second from the last]" being associated with the element "30". In addition, as illustrated in FIG. 8, the output unit 15 outputs the output item "document header" being associated with the element "company A transaction ledger," the output item "specification header" being associated with an element "air conditioner," and the output item "value[second from the last]" being associated with the element "30".

Process of Information Processing Apparatus

Figure 9:
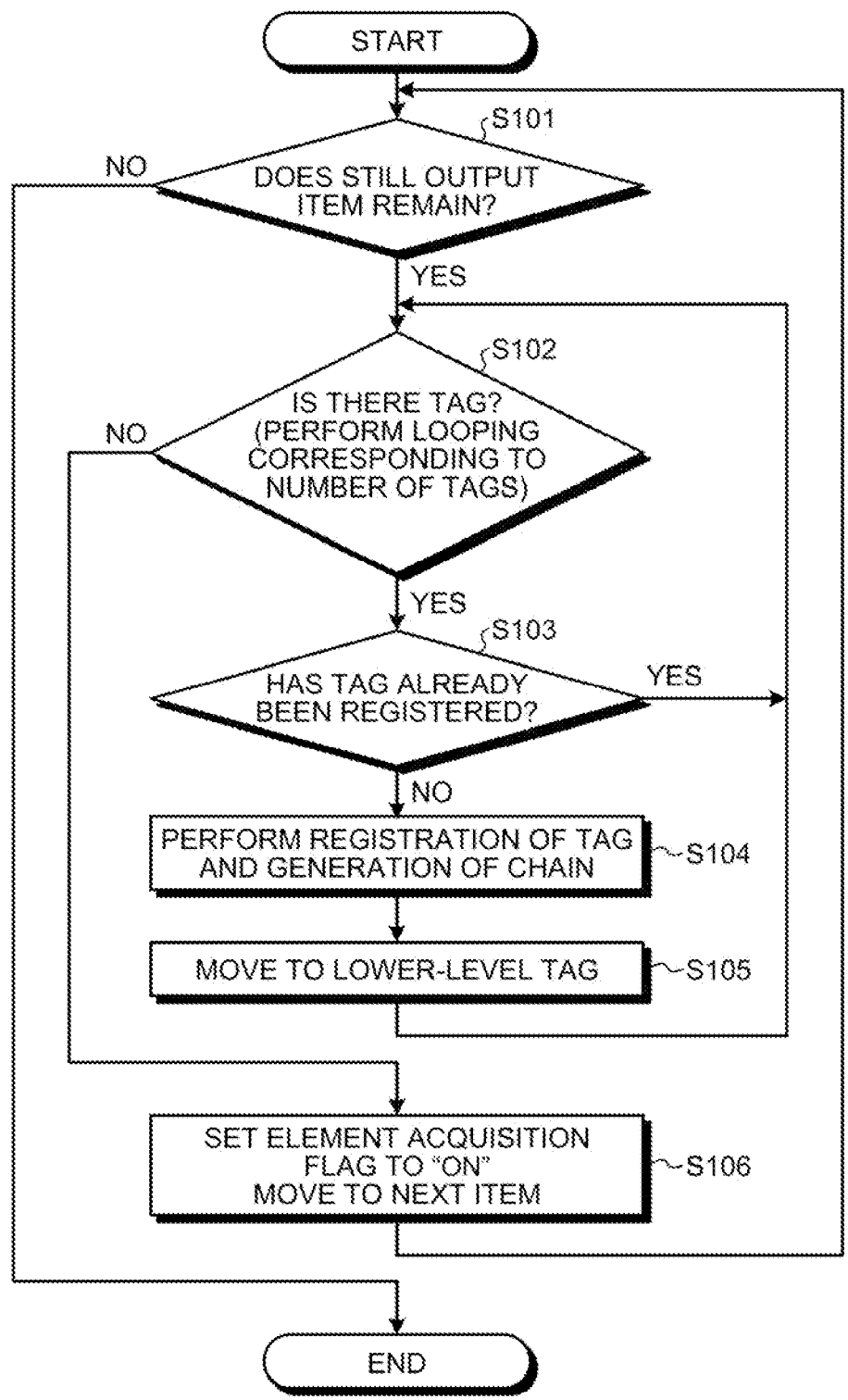
FIG. 9 is a flowchart illustrating an output item tree generating process.
Figure 10:
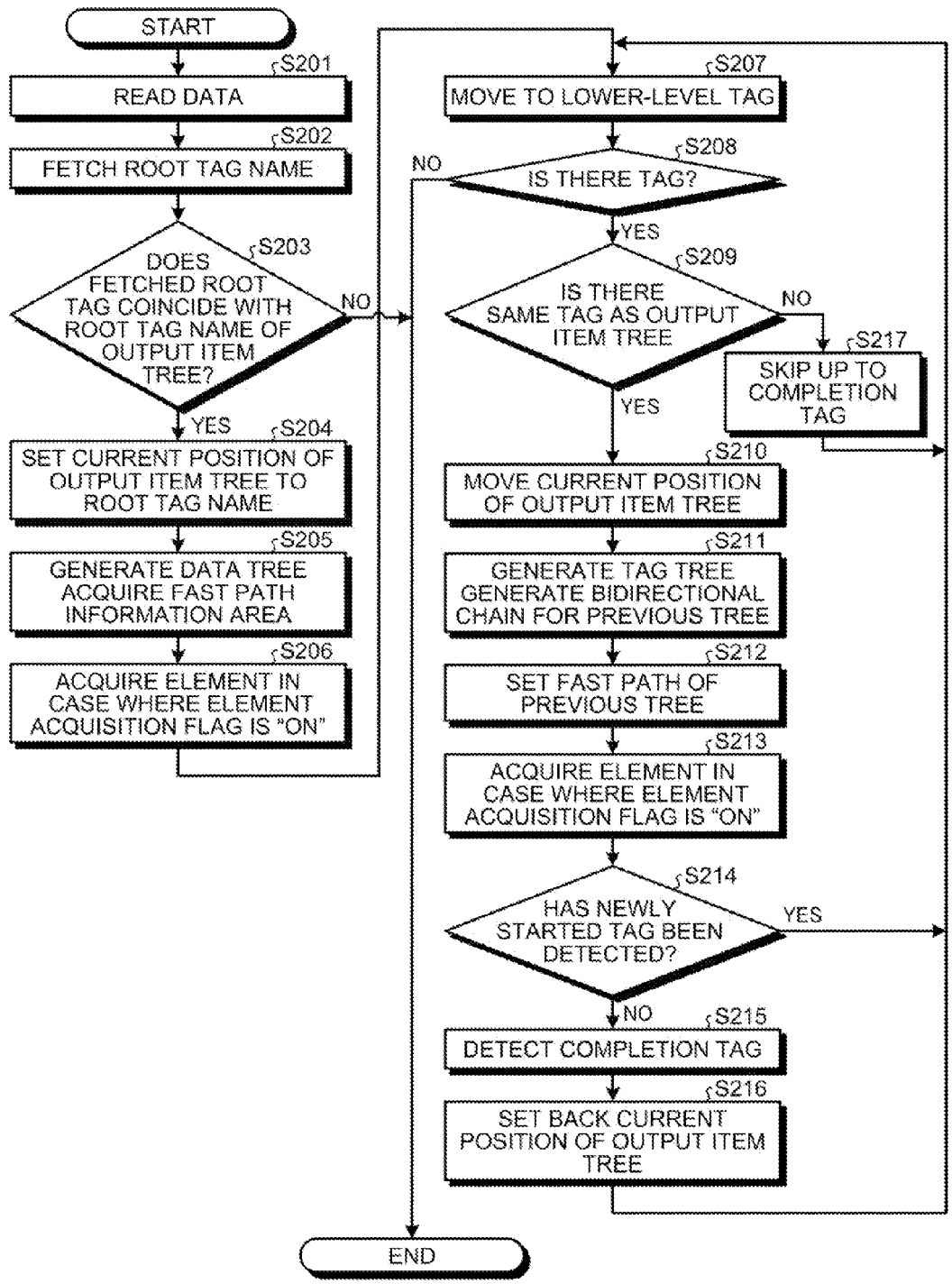
FIG. 10 is a flowchart illustrating a data tree generating process.
Figure 11:
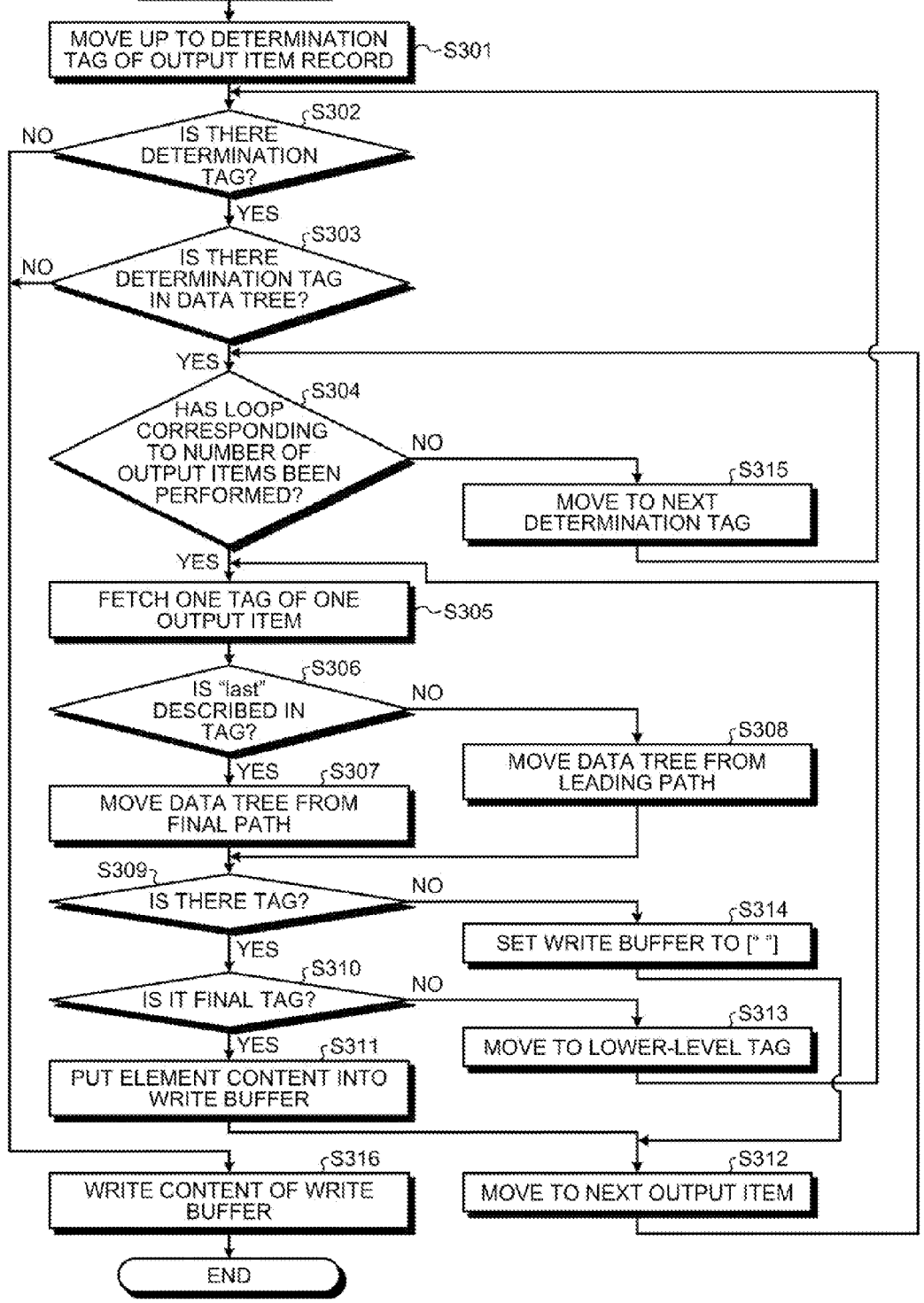
FIG. 11 is a flowchart illustrating a data tree scanning process.

Next, the process of the information processing apparatus 10 according to the second embodiment will be described with reference to FIGS. 9 to 11. FIG. 9 is a flowchart illustrating a process of generating an output item tree. FIG. 10 is a flowchart illustrating a process of generating a data tree. FIG. 11 is a flowchart illustrating a scanning process of a data tree.

As illustrated in FIG. 9, the information processing apparatus 10 determines whether there is an output item based on the output item list file 20 (Step S101) and, in a case where there is an output item (Yes in Step S101), determines whether there is a tag (Step S102). In a case where a tag is determined to be present (Yes in Step S102) as a result of this determination, the information processing apparatus 10 determines whether the tag has been already registered (Step S103).

In a case where the tag is determined to have not been already registered as a result of this determination (No in Step S103), the information processing apparatus 10 registers the tag in the output item tree and generates a chain for connection to an other tag (Step S104). Then, the information processing apparatus 10 moves the process to a lower-level tag (Step S105) and goes back to Step S102. On the other hand, in a case where the tag is determined to have been already registered (Yes in Step S103), the information processing apparatus 10 does not perform registration of the tag and goes back to Step S102.

Returning back to the description of Step S102, when it is determined such that there is no tag (No in Step S102) as a result of registration for all the tags, the information processing apparatus 10 sets the element acquisition flag to "ON," moves the process to the next item (Step S106) and goes back to Step S101. Returning back to the description of Step S101, when it is determined such that there is no output item (No in Step S101), the information processing apparatus 10 terminates the output item tree generating process.

Next, the data tree generating process will be described with reference to FIG. 10. As illustrated in FIG. 10, when the XML data is read (Step S201), the information processing apparatus 10 fetches a root tag name that is the leading tag name from the XML data (Step S202) and compares the fetched root tag name with the root tag name of the output item tree (Step S203). In a case where the fetched root tag name is determined not to coincide with the root tag name of the output item tree (No in Step S203) as a result of comparison, the information processing apparatus 10 terminates the data tree generating process.

On the other hand, when the fetched root tag name coincides with the root tag name of the output item tree (Yes in Step S203), the information processing apparatus 10 sets the current position of the output item tree to the root tag name (Step S204). Then, the information processing apparatus 10 registers the root tag in the data tree so as to generate a data tree and acquires an area used for storing the fast path information (Step S205). Subsequently, in a case where the element acquisition flag of the root tag is "ON," the information processing apparatus 10 acquires an element (Step S206) and moves the process to a lower-level tag of the XML data (Step S207).

Then, when the process is moved to the lower-level tag, the information processing apparatus 10 determines whether or not there is a tag in the XML data (Step S208). When it is determined such that there is no tag (No in Step S208), the information processing apparatus 10 terminates the data tree generating process. On the other hand, when it is determined such that there is a tag (Yes in Step S208), the information processing apparatus 10 determines whether or not there is the same tag as that of the output item tree (Step S209). When it is determined such that there is no same tag as that of the output item tree as a result of determination (No in Step S209), the information processing apparatus 10 skips up to the completion tag (Step S217) and moves the process to the next lower-level tag (Step S207).

On the other hand, when it is determined such that there is the same tag as that of the output item tree (Yes in Step S209), the information processing apparatus 10 moves the current position of the output item tree (Step S210), generates a data tree, and generates a bidirectional chain for the previous tree (Step S211).

Then, the information processing apparatus 10 sets the fast path 17 of the previous tree (Step S212). When the element acquisition flag is "ON," the information processing apparatus 10 acquires an element (Step S213) and newly detects a start tag (Step S214). Then, when a start tag is newly detected (Yes in Step S214), the information processing apparatus 10 goes back to Step S207 and repeats the process.

On the other hand, when a start tag is not newly detected (No in Step S214) but a completion tag is detected (Step S215), the information processing apparatus 10 sets the current position of the output item tree back to a higher-level hierarchy that is higher by one level (Step S216) and goes back to Step S207.

Next, the data tree scanning process will be described with reference to FIG. 11. As illustrated in FIG. 11, the information processing apparatus 10 moves the process up to the determination tag of the output item record (Step S301) and determines whether there is a determination tag (Step S302). When it is determined such that there is no determination tag as a result of this determination (No in Step S302), the information processing apparatus 10 writes the content of the write buffer (Step S316) and terminates the process.

On the other hand, when it is determined such that there is a determination tag (Yes Step S302), the information processing apparatus 10 determines whether or not there is a determination tag in a data tree (Step S303). When it is determined such that there is no determination tag in the data tree (No in Step S303) as a result of determination, the information processing apparatus 10 writes the content of the write buffer (Step S316) and terminates the process.

On the other hand, when it is determined such that there is a determination tag in the data tree (Yes in Step S303), the information processing apparatus 10 determines whether looping corresponding to the number of the output items has been performed (Step S304). When it is determined such that looping corresponding to the number of the output items has not been performed (No in Step S304) as a result of determination, the information processing apparatus 10 moves the process to the next determination tag (Step S315) and goes back to Step S302. On the other hand, when it is determined such that looping corresponding to the number of the output items has not been performed (Yes in Step S304), the information processing apparatus 10 fetches one tag of one output item (Step S305). Then, the information processing apparatus 10 determines whether or not "last" is described in the tag (Step S306). When "last" is described in the tag (Yes in Step S306) the information processing apparatus 10 moves in the data tree, using the final path of the fast path information (Step S307).

On the other hand, when it is determined such that "last" is not described in the tag (No in Step S306), the information processing apparatus 10 moves in the data tree, using the leading path of the fast path information (Step S308). Thereafter, the information processing apparatus 10 determines whether there is a tag (Step S309). When it is determined such that there is no tag (No in Step S309), the information processing apparatus 10 puts " " indicating an error into the write buffer (Step S314) and moves the process to the next item (Step S312).

On the other hand, when it is determined such that there is a tag (Yes in Step S309), the information processing apparatus 10 determines whether the tag is a final tag (Step S310). When the tag is determined not to be the final tag (No in Step S310) as a result of the determination, the information processing apparatus 10 moves the process to a lower-level tag (Step S313) and goes back to Step S305.

On the other hand, when the tag is determined to be a final tag (Yes in Step S310), the information processing apparatus 10 puts the element content (Step S311) into the write buffer, moves the process to the next output item (Step S312), and goes back to Step S304.

Advantages of Second Embodiment

As described above, when an output request is received, the information processing apparatus 10 generates tree-structure data from the hierarchical-structure data based on an output item that is included in the output request. Then, the information processing apparatus 10 scans the generated tree-structure data, searches for data corresponding to the output item, and outputs the output item. Accordingly, the information processing apparatus 10 generates a data tree having the requisite minimum size and scans a tree generated to have the requisite minimum size. Therefore, the information processing apparatus 10 can reduce the amount of consumption of the memory 16 and shorten the time required for a search process.

In addition, according to the second embodiment, the information processing apparatus 10 generates output item tree information that is tree-structure data representing the connection relationship among the tag information and also representing the tag information of the output items included in the output request. Then, the information processing apparatus 10 generates tree-structure data from the hierarchical-structure data to be searched. Accordingly, the information processing apparatus 10 generates a tree having a requisite minimum size based on the output item tree. Therefore, the information processing apparatus 10 can reduce the amount of consumption of the memory 16 and shorten the time required for a search process.

In addition, according to the second embodiment, the information processing apparatus 10 generates the tree-structure data from the hierarchical structure data and generates the fast path information that represents the storage position of the leading data and the storage position of the rear-most data among a plurality of data arranged under the tag of the output item of the tree-structure data. Then, the information processing apparatus 10 searches for data corresponding to the output item by scanning the tree-structure data and using the generated fast path information. Therefore, the information processing apparatus 10 can perform the search process at higher speed.

[c] Third Embodiment

Until now, embodiments of the present invention have been described. However, the present invention may be implemented in various forms other than the above-described embodiments. Thus, hereinafter, another embodiment belonging to the scope of the present invention will be described below as a third embodiment.

(1) System Configuration Etc.

The constituent elements of each device illustrated in the figure are functionally conceptual and are not necessarily configured as illustrated in the figure in terms of a physical configuration. In other words, specific forms of separation or integration of the devices are not limited to those illustrated in the figures. Thus, the whole or part of the forms may be functionally or physically separated or integrated in arbitrary units in accordance with various loads, use states, and the like. For example, the output item tree generating unit 11 and the data tree generating unit 13 may be integrated together.

(2) Program

Figure 12:
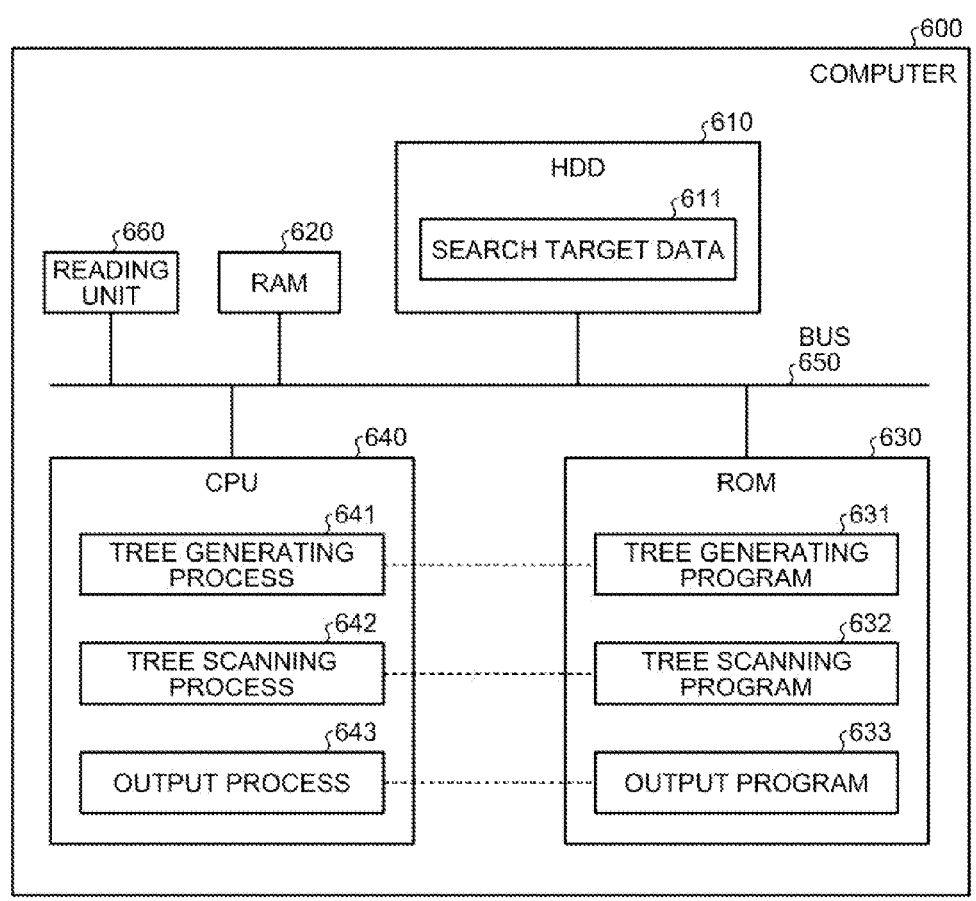
FIG. 12 is a diagram illustrating an example of a computer that executes a search program.
Figure 13:
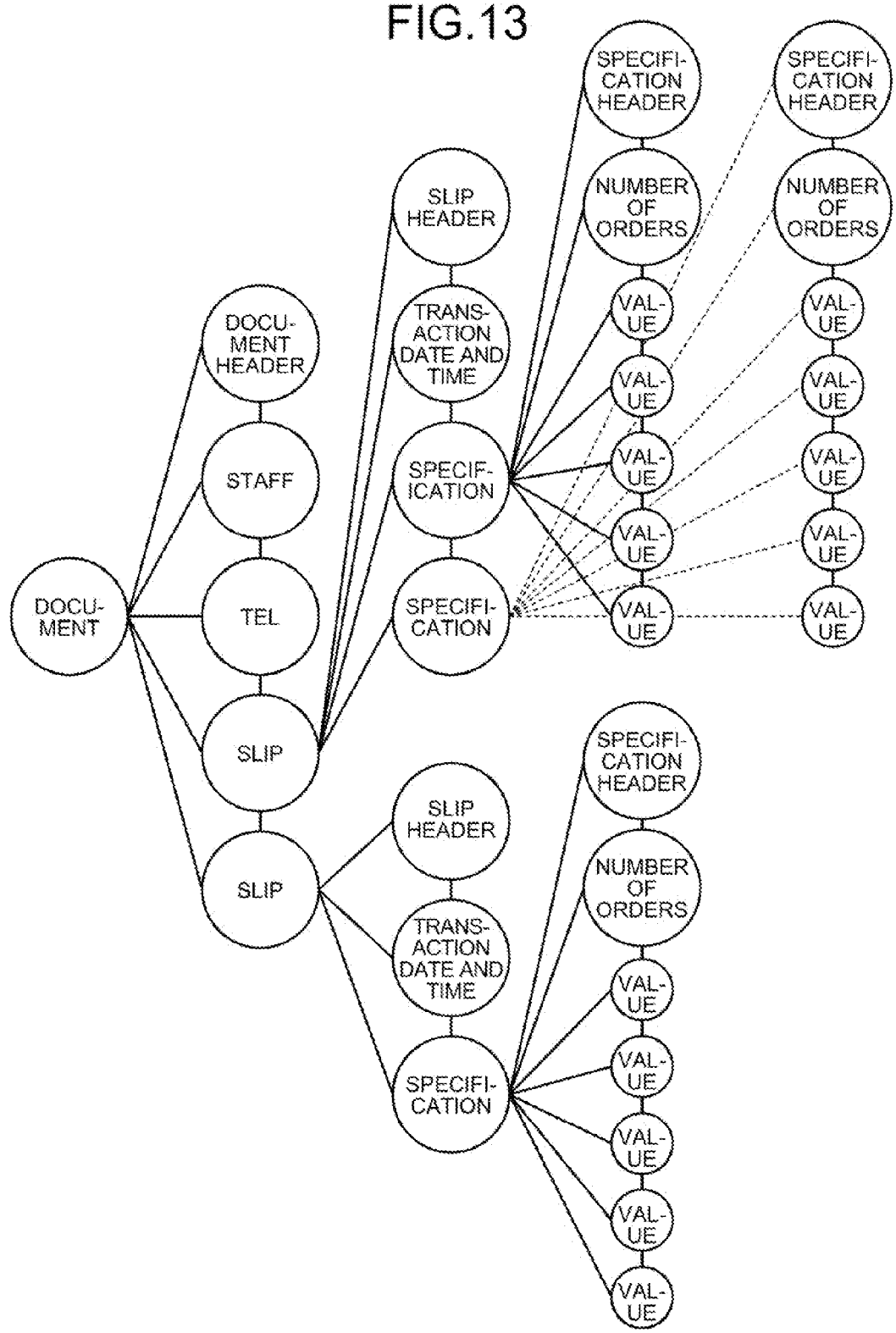
FIG. 13 is a diagram illustrating the tree structure of search target data.
Figure 14:
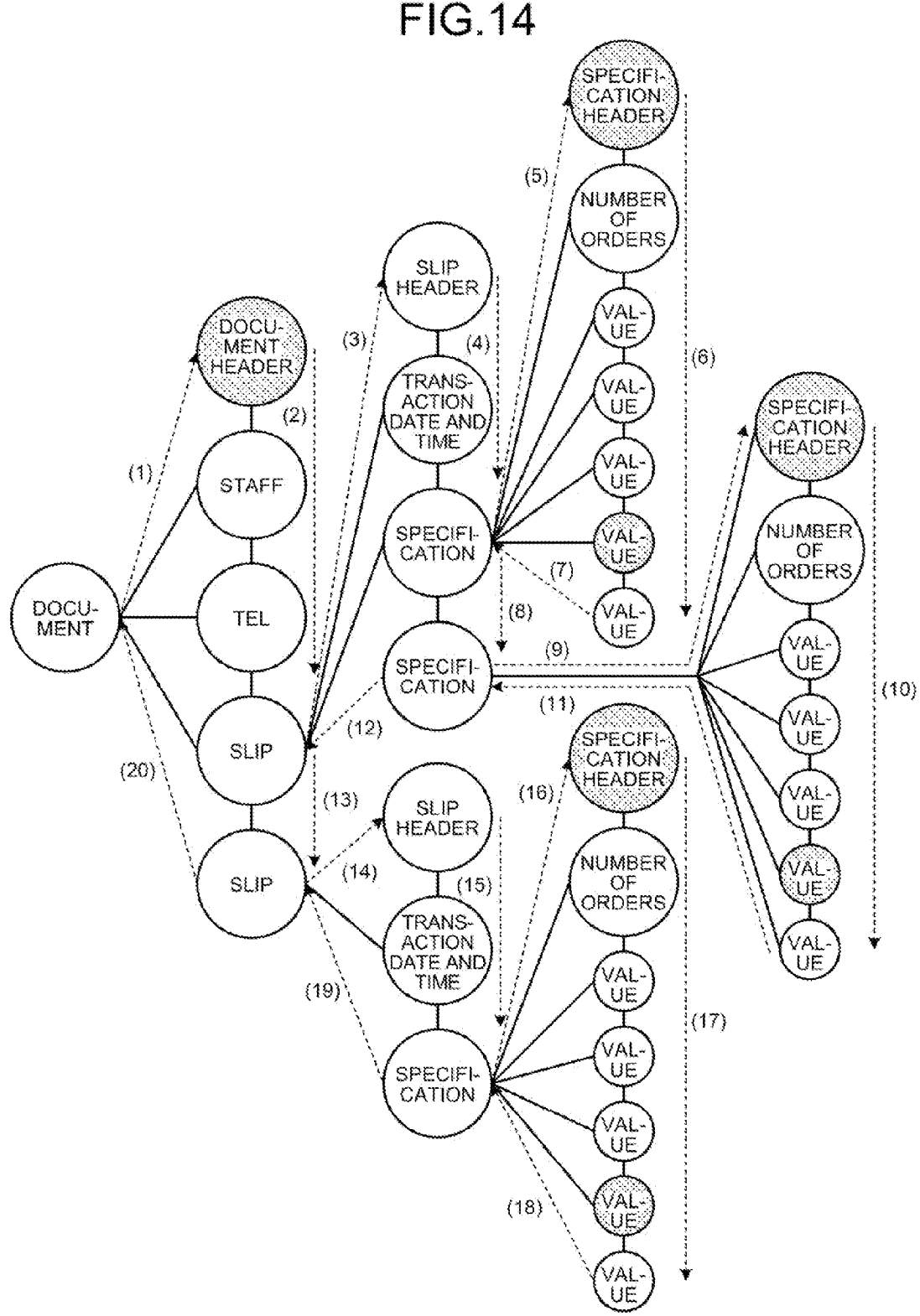
FIG. 14 is a diagram illustrating a general scanning method.

The various processes described in the above-described embodiments may be realized by executing a program, which is prepared in advance, by using a computer. Hereinafter, an example of a computer that executes a program having the same functions as those of the above-described embodiments will be described with reference to FIG. 12. FIG. 12 is a diagram illustrating a computer that executes a search program.

As illustrated in FIG. 12, a computer 600 executing the search program is configured by interconnecting an HDD 610, a RAM 620, a ROM 630, and a CPU 640 with the use of a bus 650.

The ROM 630 preliminarily stores the search program that has the same functions as those of the above-described embodiments, that is, as illustrated in FIG. 12, a tree generating program 631, a tree scanning program 632, and an output program 633. The programs 631 to 633, similarly to the constituent elements of the information processing apparatus illustrated in FIG. 2, may be configured through appropriate integration or division.

As the CPU 640 reads out the programs 631 to 633 from the ROM 630 and executes the programs, as illustrated in FIG. 12, the programs 631 to 633 function as a tree generating process 641, a tree scanning process 642, and an output process 643.

In addition, in the HDD 610, as illustrated in FIG. 12, search target data 611 is stored. The CPU 640 registers the search target data 611, reads out the search target data 611, stores the search target data 611 in the RAM 620, and performs a process based on the data stored in the RAM 620.

In addition, the search program may be recorded in a computer-readable recording medium such as a hard disk, a flexible disk (FD), a CD-ROM, an MO, or a DVD and may be executed by being read out by a reading unit 660 of the computer 600.

The amount of memory consumption can be reduced and the time required for a search process can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium having stored therein a search program which causes a computer to execute a process comprising:
   first generating, based on an output item included in an output request when the output request is received, tree-structure data from hierarchical-structure data to be searched;
   second generating path information that represents storage positions of leading data and rear-most data from among a plurality of data that are arranged under a tag of the output item of the tree-structure;
   searching for data corresponding to the output item by scanning the tree-structure data by using the path information generated at the second generating; and
   outputting the data searched for at the searching.

2. A search apparatus comprising:
   a generating unit that generates, based on an output item included in an output request when the output request is received, tree-structure data from hierarchical-structure data to be searched, the generating unit generating path information that represents storage positions of leading data and rear-most data from among a plurality of data that are arranged under a tag of the output item of the tree-structure;
   a searching unit that searches for data corresponding to the output item by scanning the tree-structure data by using the path information generated by the generating unit; and
   an outputting unit that outputs the data searched for by the searching unit.

3. A search method comprising:
   first generating, using a computer and based on an output item included in an output request when the output request is received, tree-structure data from hierarchical-structure data to be searched;
   second generating path information that represents storage positions of leading data and rear-most data from among a plurality of data that are arranged under a tag of the output item of the tree-structure;
   searching for data corresponding to the output item by scanning the tree-structure data by using the path information generated at the second generating; and
   outputting the data searched for at the searching.

4. A search apparatus comprising:
   a processor; and
   a memory, wherein the processor executes:
   first generating, based on an output item included in an output request when the output request is received, tree-structure data from hierarchical-structure data to be searched;
   second generating path information that represents storage positions of leading data and rear-most data from among a plurality of data that are arranged under a tag of the output item of the tree-structure;
   searching for data corresponding to the output item by scanning the tree-structure data by using the path information generated at the second generating; and
   outputting the data searched for at the searching.

5. The non-transitory computer readable recording medium according to claim 1,
   wherein the first generating comprises:
   third generating output item tree information, which is tree-structure data, representing tag information of output items included in the output request and representing connection relationship between the tag information; and
   forth generating the tree-structure data from the hierarchical-structure data by using the output item tree information.

\* \* \* \* \*